May 12, 1959 — S. A. EMERSON — 2,885,828
PROCESS OF MAKING A MULTIFOCAL LENS BLANK
Filed Nov. 8, 1952

INVENTOR.
Stanley A. Emerson
BY
ATTORNEY

United States Patent Office 2,885,828
Patented May 12, 1959

2,885,828
PROCESS OF MAKING A MULTIFOCAL LENS BLANK

Stanley Alfred Emerson, Dayton, Ohio

Application November 8, 1952, Serial No. 319,569

6 Claims. (Cl. 49—82.1)

My invention relates to improvements in a process of making a multifocal lens blank.

An object of the present invention is to provide a process of making a trifocal lens having a relatively wide intermediate field as compared to the reading field, with such lens, at the same time, having a dividing line of desirable configuration between the minor fields.

Another object of the present invention is to provide a method for making a trifocal lens which allows great flexibility in minor field shape and power selection, and which, at the same time, provides a dividing line of desirable configuration between the two minor fields.

A further object of the present invention is to provide a method for making a trifocal lens which provides great flexibility in positioning the optical centers of inserted minor field segments.

These advantages are obtained by my novel method of construction which comprises securing two overlapping buttons to a main blank of optical glass. The underlying button is completely formed so that a portion of its area becomes essentially a portion of the main blank upon fusing the button to the blank. Another portion of this button is of different refractive index from that of the main blank to provide a minor field for the lens.

To provide a second minor field, a second composite button, having an upper and lower portion, is then secured to the main blank. The refractive index of the upper portion of the second button is the same as the refractive index of that portion of the first mentioned button which provides the first mentioned minor field. Such upper portion of the second button is positioned to lap over the first mentioned minor field. The lower portion of the second button provides the second minor field and is of a refractive index different from the indices of the other portions of the lens.

Each of the two buttons is provided with a curved rear surface that is suitable for joining with a corresponding curved surface on the main blank. The two buttons are positioned on the main blank in lapped relationship so that the rear surfaces intersect.

I control the position of such intersection so that it will be invisible to the eye upon looking through the lens. To accomplish this, the second countersink surface is ground into the main blank and atttached to the underlying button so that such second surface intersects the rear surface of the underlying button on the lower portion of such button after such lower portion has been fused to the main blank.

In the present invention, when the eye shifts from one minor field to the other minor field, the eye will experience a change in field power due to the difference in refractive index between the two minor fields. To provide a desirable interfield delineation at the junction of the two minor fields, I position the overlying button in a particular relationship with the underlying button. The upper and lower portions of the overlying button are formed with a junction line having a plan view configuration that corresponds with the plan view configuration of the bottom edge of the intermediate field portion of the underlying button. The overlying button is located so that the junction line thereon is aligned with and superimposed over the bottom edge of the field forming portion of the underlying button. These superimposed junction lines are preferably of straight line configuration but they can be formed as corresponding curves without departing from the present inventive concept.

Further objects and advantages of the present invention will be apparent from the following description, reference being had to the accompanying drawings wherein preferred forms of embodiments of the invention are clearly shown.

Figure 1:
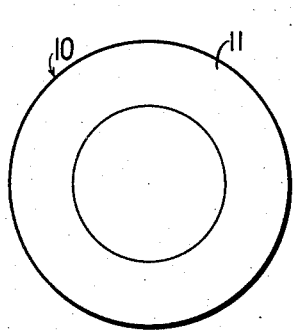
Fig. 1 is a plan view of a main lens blank used in the present invention.
Figure 2:
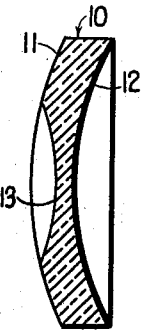
Fig. 2 is a vertical section corresponding to Fig. 1.
Figure 3:
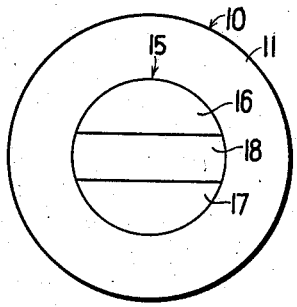
Fig. 3 is a second plan view of the blank of Fig. 1.
Figure 4:
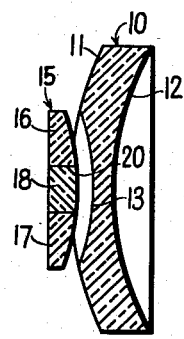
Fig. 4 is a vertical section corresponding to Fig. 3.

Referring to the drawing and more particularly to Fig. 1, a main blank of optical glass is shown at 10. This blank is formed with a front surface 11 and a rear surface 12 as best seen in Fig. 2. The front surface is provided with a countersink portion which is formed by grinding and polishing a primary curved surface 13 into the front portion of the blank. A button indicated generally at 15 is shown in Fig. 4. Such button is preferably formed in three portions. Upper portion 16 and lower portion 17 are formed of glass having the same refractive index as that of the main blank so that when the button 15 is secured to the main blank such upper and lower portions of the button 15 can be fused to the main blank, thereby becoming essentially a portion of such main blank. The upper portion 16 and the lower portion 17 are shown in fused relationship with the main blank in Figs. 5 and 6.

Figure 5:
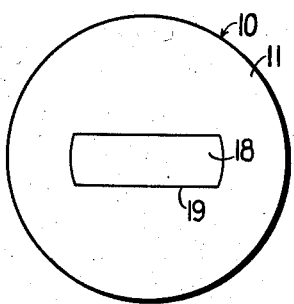
Fig. 5 is a third plan view of the blank of Fig. 1.
Figure 6:
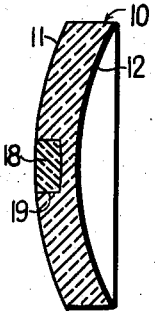
Fig. 6 is a vertical section corresponding to Fig. 5.

The button 15 is also provided with an intermediate portion 18 which is formed of glass having a different refractive index from that of the main blank. It is this intermediate portion 18 of the button 15 that serves as one of the minor optical fields in the finished lens. Fig. 5 is an elevational view showing the shape of the minor field formed by the intermediate portion 18 of button 15 after fusing and topsiding of the button and blank.

A curved rear surface 20 is formed on the rear portion of button 15 as shown in Fig. 4. The surface 20 is formed with approximately the same radius as the curve 13 which was ground into the front portion of the main blank. The curvature of the surface 13 is selected to provide the desired power for the minor field portion 18.

Figure 8:
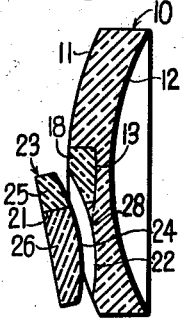
Fig. 8 is a vertical section corresponding to Fig. 7.

After grinding off the surplus stock of the button 15 and reducing the insert 18 to a predetermined shape and size by further grinding of the surface 11, a secondary curved surface 22 is then formed in the front portion of the main blank as shown in Fig. 8, a second composite button indicated generally at 23 is provided with a curved surface 24 which is suitable for joining to the curved surface 22 on the main blank. This composite button 23 comprises an upper portion 25 of the same refractive index as that of the intermediate portion 18 of the first button 15 and a lower portion 26 of a different refractive index from the indices of the other elements of lens. This lower portion 26 of the second button provides the second minor field for the lens.

Figure 7:
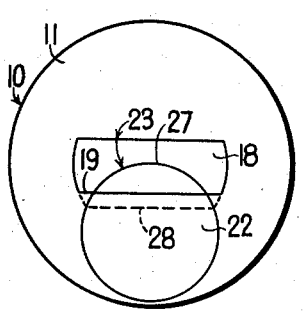
Fig. 7 is a fourth plan view of the blank of Fig. 1.
Figure 9:
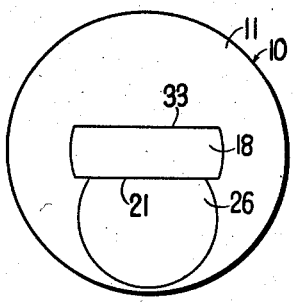
Fig. 9 is a fifth plan view of the blank of Fig. 1.
Figure 10:
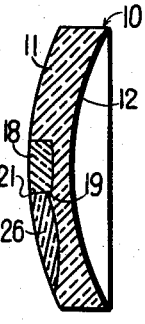
Fig. 10 is a vertical section corresponding to Fig. 9.

Before the second button 23 is secured to the surface 22, the main blank will appear as seen in Fig. 7. At this stage, the arc 27 of the border of the surface 22 which lies above the line 28 will still be visible. This arc 27 of the border later becomes invisible after the overlapping portions of the two buttons have been fused together and after the main blank and buttons have been topsided. Figs. 9 and 10 show the blank and buttons as they appear after these operations have been performed.

The two surfaces 13 and 22, which are formed on the front portion of the main blank, are shown in the drawing as being of the same radius of curvature. Hence these two surfaces will have an intersection which appears as a straight dotted line 28 in the plan view of the lens as seen in Fig. 7. If the surfaces 13 and 22 were formed of different curvature, the intersection would appear as a curve in Fig. 7.

The position of the intersection 28 is controlled so that it will be invisible to the eye upon looking through the lens. To accomplish this, the second countersink surface 22 is ground into the main blank 11 and attached underlying button 15 so that such second surface intersects the rear surface 20 of the underlying button on the lower portion 17 of such button after such lower portion has been fused to the main blank.

To provide a desirable interfield delineation at the junction of the two minor fields, I position the overlying button 23 in a particular relationship with the underlying button 15. The upper and lower portions of the overlying button 23 are joined together along a plane surface which appears as the straight line 21 in Figs. 8, 9, and 10. I position such straight line division 21 so that it is aligned with and superimposed over the bottom edge 19 of the intermediate portion 18 of the underlying button. It will be remembered that such edge 19 also appears as a straight line in a plan view of the lens as seen in Figs. 5 and 7.

Figure 11:
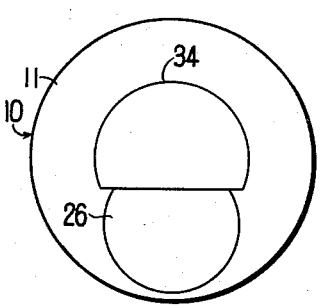
Fig. 11 shows another aspect of the present invention.

Fig. 11 shows a modification which embodies the present invention. This lens is made in the same manner as the method just described except that the underlying button 15, which provides the upper minor field area, is composed of two portions instead of three portions as is the button shown at 15 in Fig. 4. This button modification results in a lens, such as is shown in Fig. 11, having a curved border 34 for the upper minor field instead of the straight border as shown at 33 in Fig. 9.

While the forms of embodiments of the present invention as herein disclosed constitute preferred forms, it is to be understood that other forms might be adopted, all coming within the scope of the claims which follow:

1. The method of making a multifocal lens comprising, forming a primary curved surface in a main blank of optical glass; forming a first button comprising a first segment of optical glass having the same index of refraction as that of the main blank and a second segment of optical glass having a different index of refraction than said first segment with one edge surface thereof complementing and abutting an edge surface of said first segment of the button; forming a continuous curved surface, complementing the primary curved surface in the main blank, across the back surface of each segment of the button; attaching said composite button to the main blank with said curved surfaces of the blank and button respectively in complementing relationship; forming a secondary curved surface on the attached main blank and button so as to intersect the primary curved surface of the main blank beyond the confines of the second segment of the first button; forming a second button comprising a first segment of optical glass, having the same index of refraction as the second segment of the first button and having an edge surface simulating the shape of said edge surface of the said second segment of said first button, and a second segment of optical glass having a different index of refraction than at least one of the indices of the main blank and the second segment of the first button, and having an edge surface complementing the edge surface of the first segment of the second button; forming a continuous optical surface, complementing the secondary curved surface of the blank and the first button across the back face of each segment of the second button; and attaching the second button to the blank with the curved surface thereof in complementing relationship with the secondary curved surface of the main blank and the button and with the first segment of the second button confronting the second segment of the first button and with said edge surfaces of the last-mentioned segments coinciding.

2. Those steps in the method as defined in claim 1 characterized in that the step of attaching the first button to the main blank is by fusion.

3. Those steps in the method as defined in claim 1 characterized in that the abutting edge surfaces of the first button are flat.

4. Those steps in the method as defined in claim 1 characterized in that both of said curved surfaces of the main blank have substantially the same radius.

5. Those steps in the method as defined in claim 1 characterized in that the abutting edge surfaces of the first button are flat and both of said curved surfaces of the main blank have substantially the same radius.

6. Those steps in the method as defined in claim 1 characterized in that the primary curved surface extends deeper into main blank than the secondary curved surface in said blank.

References Cited in the file of this patent

UNITED STATES PATENTS

| | | |
|---|---|---|
| Re. 19,142 | Hancock | Apr. 24, 1934 |
| 1,158,102 | Bolde | Oct. 26, 1915 |
| 1,632,208 | Watson et al. | June 14, 1927 |
| 1,932,100 | Culver et al. | Oct. 24, 1933 |
| 1,942,333 | Haussmann | Jan. 2, 1934 |
| 1,995,680 | Laabs | Mar. 26, 1935 |
| 2,030,968 | Culver et al. | Feb. 18, 1936 |
| 2,033,573 | Hancock | Mar. 10, 1936 |
| 2,035,846 | Sterling | Mar. 31, 1936 |
| 2,053,377 | Price | Sept. 8, 1936 |
| 2,053,551 | Calver et al. | Sept. 8, 1936 |
| 2,065,132 | Hammon | Dec. 22, 1936 |
| 2,071,616 | Culver et al. | Feb. 23, 1937 |
| 2,177,021 | Hammon | Oct. 24, 1939 |
| 2,177,022 | Hammon | Oct. 24, 1939 |
| 2,274,143 | Houchin | Feb. 24, 1942 |
| 2,405,826 | Hammon | Aug. 13, 1946 |
| 2,447,068 | Hammon | Aug. 17, 1948 |

FOREIGN PATENTS

| | | |
|---|---|---|
| 440,438 | Great Britain | Dec. 30, 1935 |